July 20, 1954 N. MARCHAND 2,684,278

SENSITIVITY CONTROL FOR MULTICHANNEL RECORDING APPARATUS

Filed March 12, 1948 3 Sheets-Sheet 1

INVENTOR.
NATHAN MARCHAND
BY Harry Cohen
ATTORNEY

July 20, 1954 N. MARCHAND 2,684,278

SENSITIVITY CONTROL FOR MULTICHANNEL RECORDING APPARATUS

Filed March 12, 1948

3 Sheets-Sheet 2

INVENTOR.
NATHAN MARCHAND

BY Harry Cohen

ATTORNEY

SENSITIVITY CONTROL FOR MULTICHANNEL RECORDING APPARATUS

Filed March 12, 1948

*INVENTOR.*

NATHAN MARCHAND

BY Harry Cole

ATTORNEY

Patented July 20, 1954

2,684,278

UNITED STATES PATENT OFFICE 2,684,278

SENSITIVITY CONTROL FOR MULTI-CHANNEL RECORDING APPARATUS

Nathan Marchand, New York, N. Y., assignor, by mesne assignments, to Technicon Cardiograph Corporation, New York, N. Y.

Application March 12, 1948, Serial No. 14,558

8 Claims. (Cl. 346—33)

The present invention relates to electro-cardiographs and to electrical and electronic circuits therefor. More particularly, this invention relates to multiple-lead electro-cardiographs.

In my application Ser. No. 762,633, filed July 22, 1947, now Patent No. 2,627,267, I have disclosed and claimed a multiple lead electro-cardigraph operable to produce simultaneously and directly on a record web or sheet a plurality of graphs or traces of body voltage variations transmitted from the subject by the several leads, respectively, and to produce said graphs or traces on the web or record sheet in such manner that they all have an identical time relation with respect to each other. For example, the standard or inter-extremity potentials, namely, the left arm-right arm voltage variations, the right arm-left leg voltage variations, the left arm-left leg voltage variations are all recorded simultaneously on the record sheet in the same time relation so that the physician, cardiologist, or diagnostician can obtain not only the information as revealed by said three different voltage variations considered separately but also as revealed by said three voltage variations considered in their correlated aspects at any instant of time along a common time co-ordinate of the three cardiograms. In this connection it will be understood that even when cardiograms corresponding to different leads are obtained in immediate succession, the cardiologist cannot be certain that the condition of the subject's heart had not changed in the time intervals between the taking of the several cardiograms, even if such intervals are very short. Hence, he is not able to correlate the information revealed by the three different lead cardiograms, with the same degree of certainty of correct analysis which is possible when the several cardiograms are obtained at the same time.

In the apparatus described in my abovementioned application provision is made not only for recording the standard (inter-extremity) potentials, referred to above, but also for recording the chest voltages, and for recording the extremity potentials with reference to a point of zero potential. A selector switch is provided in said apparatus for connecting the different sets of leads to the companion channels, respectively, each of which includes electronic amplifying means for amplifying the body voltages transmitted to said channels in accordance with the setting of the selector switch. In using the cardiograph, the sensitivity of the electronic amplifying means is adjusted so that normally a deflection ratio of one centimeter of the recording stylus or pen is obtained for one millivolt input to the amplifying means when recording the standard or inter-extremity potentials. On the other hand, when either the chest potentials or the extremity potentials with respect to a point of zero potential are to be recorded, it is necessary or desirable to alter the sensitivity of the amplifiers in order to provide the proper amplitude of deflection of the recorder pen or stylus. For example, the chest potentials, being taken close to the heart, are larger than the inter-extremity or standard potentials, while the extremity potentials with reference to a point of zero potentials are considerably weaker than the inter-extremity potentials. Accordingly, when the chest potentials are to be recorded, the sensitivity of the amplifier is reduced in comparison with the amplifier sensitivity when the inter-extremity potentials are recorded, usually so as to obtain a pen or stylus deflection of ½ cm. for one millivolt input to the amplifier, and when the extremity potentials with respect to a point of zero potentials are to be recorded, the sensitivity of the amplifier is increased, usually so as to obtain a pen or stylus deflection of 1½ cm. for one millivolt input to the amplifier.

In accordance with the present invention and pursuant to the primary object thereof, provision is made for altering the sensitivity of the amplifiers of all the channels not only simultaneousy but substantially instantaneously, from one sensitivity to another, without loss of record of intermediate heart beats and without re-adjustment of any of the other controls of the amplifier.

Another object of this invention is to provide means for reducing the gain of the amplifiers of all the channels simultaneously to zero whereby to prevent deflection of the pen or stylus of the recorder, when desired, especially when the leads are removed from the patient resulting in extraneous signals reaching the pen-actuating means of the recorder, the reduction of the amplifier gain to zero being accomplished pursuant to this object of the invention without disturbing the pre-set gain-adjustment of the amplifier.

The above and other objects, features and advantages of the present invention will be fully understood from the following description considered in connection with the accompanying illustrative drawings.

Figure 1:
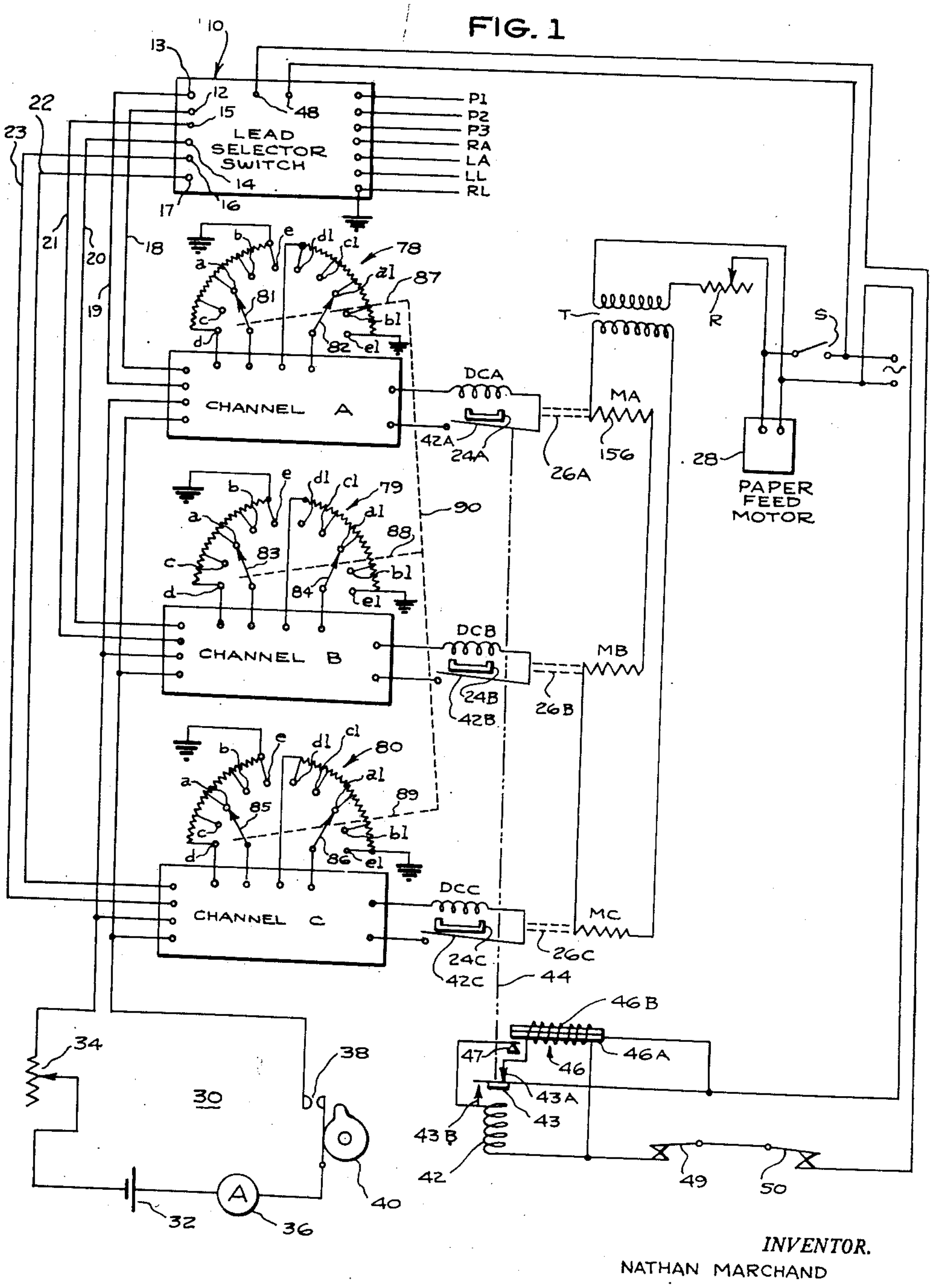
Fig. 1 is a schematic illustration of a multiple lead electro-cardiograph embodying the present invention.

As shown more or less schematically in Fig. 1, the electro-cardiograph of the present invention comprises a lead selector switch 10 having a plurality of input terminals designated P1, P2, P3, RA, LA, LL, RL, adapted to be connected by suitable conductors and companion electrodes (not shown) to different parts, respectively, of the subject whose heart condition is to be investigated. The terminal RL is to be connected to the right leg of the subject and is grounded as shown. The terminals RA, LA, and LL are the extremity terminals for connection, respectively, to the subject's right arm, left arm and left leg, in accordance with known principles of cardiology. The terminals P1, P2 and P3 are the precordial terminals. As will hereinafter more specifically appear, three leads are connected by movable contact members to three selected input terminals of the switch. The movable contact members are connected in pairs to the three pairs of output terminals 12—13, 14—15, and 16—17, of the switch. For example, in one setting of the switch 10, the RA and LA leads are connected to terminals 12 and 13, respectively, the LL and RA leads are connected to the terminals 14 and 15, respectively, and the leads LL and LA are connected to the terminals 16 and 17, respectively. In other settings of the switch, the three leads are connected to different input terminals of the switch, as will be later explained.

The three leads, thus connected to the selected input terminals, are connected by means of the conductors 18—19, 20—21, and 22—23, respectively, to three different channels A, B, and C, respectively. Each of said channels includes electronic amplifying means for amplifying the body voltages transmitted to said channels by said three leads from across three pairs of different parts of the subject's body. The electrical circuits of these channels are all alike, one of these circuits, subsequently described herein, being shown in Fig. 2 as illustrative of the electrical circuit of each channel, there being three such circuits, one for each channel.

The output terminals of said channels are connected to the driving coils DCA, DCB, and DCC, respectively, of the magneto-motive devices which are provided in the apparatus for operating the recorder. These magneto-motive devices include a strong permanent magnet shown schematically in Fig. 1 as three permanent magnets 24A, 24B, and 24C. As described in my above-mentioned application, the driving coils are mechanically connected individually to the deflectable pens or marking elements MA, MB and MC which operate on the recording material to record the voltage variations supplied to said channels and amplified by the amplifying means provided therein as hereinbefore indicated. The recording material is preferably, but not necessarily, chemically treated paper of a known type and when such paper is used the pens or marking elements are electrically heated, as indicated by the resistances designated by the foregoing reference characters MA, MB, and MC. As will be readily understood the paper is affected by the heat of said elements whereby visual records are produced directly on a length of said paper during the movement of the latter in the direction of its length. The connections of the driving coils to the companion marking elements are indicated schematically in Fig. 1 by the dotted lines 26A, 26B, and 26C. The corresponding mechanisms will be described subsequently in detail. As indicated, a synchronous motor 28 is provided for moving the recording material or paper at uniform speed in the direction of its length. The motor is preferably energized by 60 cycle alternating current at 110 volts, and a step-down transformer T is provided for supplying heating current to the resistances of the marking elements or pens MA, MB, and MC. An adjustable resistance R is provided in the primary circuit of the transformer for regulating the heat of said marking elements.

Figure 3:
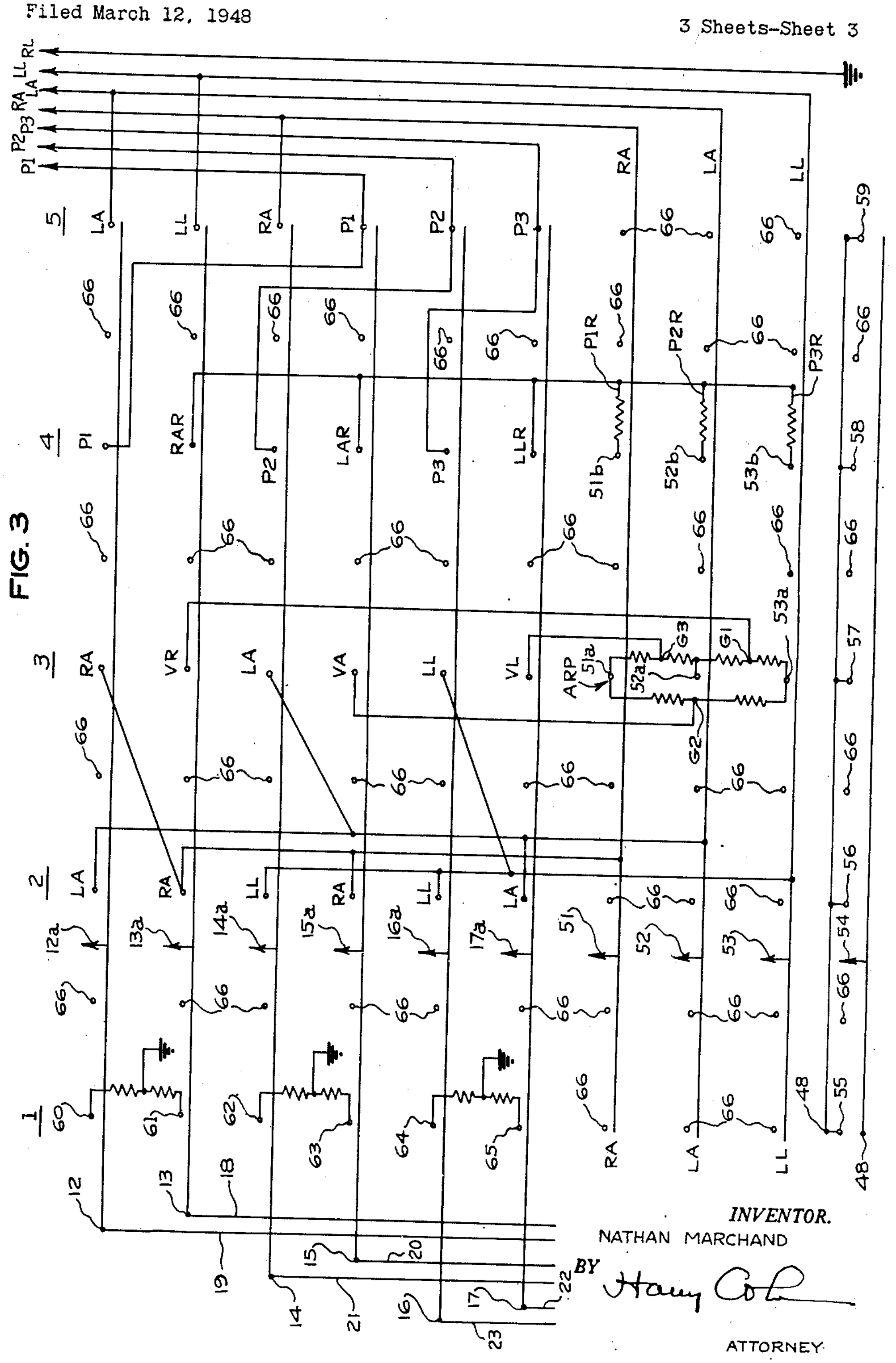
Fig. 3 is a diagrammatic illustration of the selector switch and its circuit.

Provision is made for supplying standardization voltage impulses to the three channels. For this purpose, the circuit 30 is connected to each of said channels, suitable reversing switches being provided as shown in Fig. 3 and later described. Circuit 30 includes a battery 32, as the source of voltage, a variable resistance 34, an ammeter 36, and a normally open pulse switch 38 which is periodically closed by a rotary pulse wheel 40 actuated at the proper speed in any suitable way, as by a clock motor (not shown). Ordinarily the standardization voltage is of the order of one millivolt. It will be noted that the standardization pulses are superimposed upon the several cardiograms, respectively, during the operation of the apparatus while the leads are connected to the patient or subject.

Provision is made for stabilizing the action of the amplifiers in the channels before operating the marking elements MA, MB and MC of the recorder. For this purpose there is provided a time delay relay which includes an electro-magnet the winding of which is indicated at 42. Movable switch contacts 42A, 42B and 42C are closed by the movable core 44 of the electro-magnet when the latter is energized and are opened when it is de-energized. A thermostatically controlled switch 46 having a suitable time lag in closing is provided in the circuit of winding 42 and it will be noted that the lead selector switch 10 is provided with terminals 48 which are connected in said circuit so that, as hereinafter described, the energization of relay winding 42 is under the master control of switch 10. The operation of switch 10 is such that winding 42 is de-energized and contacts 42A, 42B and 42C therefore open, whenever switch 10 is actuated to change the combination of leads which are connected to the channels, and do not close until the thermostatically controlled time-delay switch 46 closes. Thus the marking elements or pens MA, MB and MC are prevented from operating until the action of the amplifiers in the several channels becomes stable.

The circuit of winding 42 also includes the normally closed switches 49 and 50 which are in series circuit relation with each other and with said winding. These switches are opened in the event of over-excursion of any one of the marking elements in either direction laterally of the web of recording material. The preferred mechanism for accomplishing this result is described in my above-mentioned application. It will be noted that if either of switches 49 or 50 opens, winding 42 is de-energized and contacts 42A, 42B, and 42C open so that all of the driving coils for the marking elements are simultaneously de-energized thus stopping the motions of the marking elements. When either switch 49 or 50 closes after it is opened by over-excursion of any one of the marking elements, the winding remains de-energized and contacts 42A, 42B and 42C consequently remain open until the time delay switch 46 operates to close the circuit of said winding, thus affording the amplifiers in channels A, B and C time for resuming their stable action.

Figure 2:
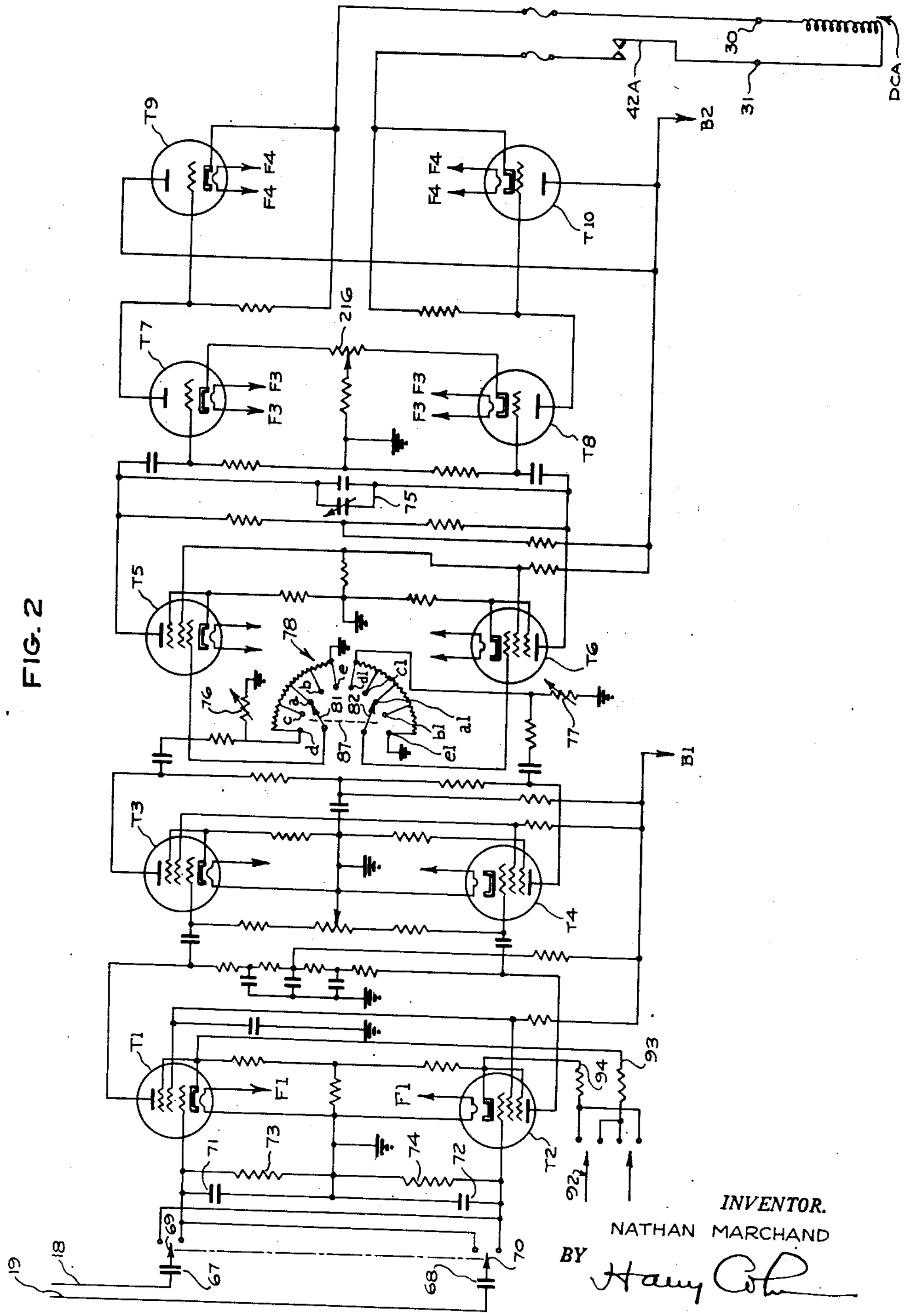
Fig. 2 is a diagrammatic illustration of one of the channels and is illustrative of each of the other channels.

The selector switch 10, which may be of any suitable mechanical construction, is illustrated diagrammatically in Fig. 2. The movable switch contacts are indicated at 12A—13A, connected to terminals 12—13 for channel A; at 14A—15A, connected to terminals 14—15 for channel B; at 16A—17A, connected to terminals 16—17 for channel C. Additional movable contacts are indicated at 51, 52 and 53 and are connected to the RA, LA, and LL terminals. The movable contact indicated at 54 is connected to one of the terminals 48, the other terminal 48 being connected to the spaced stationary contacts 55, 56, 57, 58 and 59. For convenience it may be assumed that all of the foregoing movable contacts move rectilinearly, and it will be understood that they are mechanically connected for movement in unison to and from each of the several stations 1, 2, 3, 4, and 5. Station 1 is the pre-lead test station having stationary contacts 60—61, 62—63, and 64—65 as the end terminals of the resistances shown. Each of said resistances has a mid-tap which is connected to ground as shown. These resistances are substitutes for resistances which are present when the leads are connected to the subject and are provided so that the apparatus may be tested before the leads are connected to the subject.

At station 2, the movable contacts for the three channels are connected to the LA—RA, LL—RA, and LL—LA terminals.

At station 3, the movable contacts for the three channels are connected to the three leads for the augmented extremity potentials known and designated in cardiology as *a*VR, *a*VL, and *a*VF. One stationary contact for each of the leads for augmented extremity potential consists of one of the RA, LA and LL terminals, as indicated, and the companion stationary contacts for the three channels are indicated at VR, VA and VL, respectively. The stationary contacts RA, LA and LL at station 3 are connected to the corresponding terminals by the movable contacts 51, 52 and 53 and the companion stationary contacts 51A, 52A and 53A provided in the closed loop ARP which includes the resistances shown for obtaining the augmented extremity potential. The stationary contacts VR, VA and VL are connected directly to fixed points, respectively, on said loop as indicated at G1, G2, and G3, respectively. Thus, the three augmented extremity potentials are transmitted simultaneously to the three channels, respectively, when the movable switch contacts are at station 3 so that said potentials can be recorded simultaneously by the corresponding marking elements on the recording web in the same time relation. It will be noted that the resistance connected as shown in the closed loop provides a common point of connection from RA, LA and LL and at the same time the resistances in each connection from RA, LA and LL to said common point are eliminated in measuring the several potentials across RA and said common point, across LA and said common point, and across LL and said common point. The measuring of augmented extremity potentials across a common point and RA, LA, and LL, respectively, and eliminating the effect of the resistance in taking each measurement is known practice in cardiology but heretofore, so far as I am aware, it was not possible to measure more than one potential at a time. The provision of the loop ARP and the switching connections heretofore described enable the simultaneous measurement and recording of the three augmented potentials.

At station 4, the precordial leads P1, P2 and P3 are connected to the channels A, B and C, respectively, by the movable contact members 12A—13A, 14A—15A, and 16A—17A together with the movable contact members 51, 52 and 53 which connect the RA, LA and LL terminals through the resistances P1R, P2R and P3R, respectively to the stationary contracts RAR, LAR, and LLR which are companionate with the stationary contacts P1, P2 and P3, respectively at station 4. The stationary contacts which are engaged by movable contacts 51, 52 and 53 at this station are indicated at 51*b*, 52*b* and 53*b* as terminals of the resistances P1R, P2R, and P3R, respectively. The function of these resistances is well known in cardiology but it will be noted that their arrangement and the switch-contact arrangement enable the simultaneous connection of the three precordial leads to the three channels for simultaneous recording of the potentials in accordance with the present invention. At station 5, the movable contacts 12*a*—13*a*, 14*a*—15*a*, and 16*a*—17*a* connect the LA—LL, the RA—P1, and the P2—P3 terminals to the channels A, B, and C respectively, for simultaneous recording of the corresponding potentials by the marking elements MA, MB and MC in the same time relation on the recording sheet or web.

It will be noted that at each of the stations there is a stationary contact member which is engaged by the movable contact member 54 so as to energize the circuit of the time delay relay 46 and relay winding 46 for closing the circuits of the driving coils DCA, DCB and DCC as hereinbefore explained with reference to Fig. 1.

Further, it will be observed that in moving from one station to another, all of the movable contact members of switch 10 have intermediate disengaged or off positions, respectively, so that the switch may be opened at all of its contacts without requiring movement of the movable switch contacts to one particular off or switch-open station or position. The off positions of the movable contact members are all indicated by the same reference numeral 66.

As hereinbefore explained each of the channels A, B and C (Fig. 1) comprises electronic amplifier means to which the several conductors 18—19, 20—21, and 22—23 from the selector switch are connected. As all of the channels and their amplifiers are alike a description of one, channel A being arbitrarily selected for this purpose, will suffice. Referring now to the channel circuit shown in Fig. 2, it will be noted that the conductors 18—19 are connected to the input of the voltage amplifier through the blocking condensers 67 and 68 by reversing switches 69 and 70. Condensers 67 and 68 block direct current which might otherwise flow from the subject to the amplifier. Condensers 71 and 72 are provided to bypass radio frequencies which might be present in the region of the apparatus.

Provision is made to enable the same lead to be connected to a plurality of channels without affecting amplitude or causing interaction. This is accomplished by providing means for preventing loading of one channel to the detriment of another channel to which the same lead is connected. For this purpose there is provided a high impedance comprising the resistances 73 and 74 which, for example but without limitation, are each of the order of 4.7 megohms. Other known devices may be used instead of said high impedance; for example, a cathode follower isolation amplifier may be provided in each of the lines leading to the terminals P1, P2, P3, RA, LA, and LL of switch 10 (Fig. 1).

As shown in Fig. 2, the amplifying means comprises a resistance-capacity coupled voltage amplifier, which includes the tubes T1—T2, the tubes T3—T4, and the tubes T5—T6 and a power amplifier which includes the tubes T7—T8 and the tubes T9—T10. In this respect, the amplifier circuit is of the type described and claimed in the application of Joseph Lukacs, Ser. No. 725,026 filed January 29, 1947, now Patent No. 2,638,401, and assigned to the assignee of the present application. It will be understood that the voltage amplifier provides sufficient amplification to drive the power amplifier for full excursion of the companion marking element or pen MA, MB, or MC as the case may be. It is to be noted that the amplifying means may be of any other suitable type and that the present invention is not to be limited to the use of an amplifier of the type disclosed in said Lukacs application.

The voltage amplifier is compensated for the mechanical properties of the pen and its mechanism which includes the companion driving coil and the means, hereinafter described, for operatively connecting the driving coil to its pen for actuating the latter. The compensation is accomplished by the damping control means which is preferably a capacitor 75 across the input to the power amplifier. As indicated capacitor 75 is preferably variable. Any other suitable damping control means may be used instead of the capacitor 75 without departing from the underlying idea of the invention in respect to this feature. It will be understood that the voltage and power amplifier thus provided with the damping control consequently has a gain which decreases at the frequencies at which the pen system has a high sensitivity and increases at the frequencies at which the pen system has a low sensitivity, whereby the pen or marking element of said system has a uniform excursion for the same voltage-magnitude input to the amplifier at any frequency within a range of frequencies, namely a substantially straight-line voltage-response at any frequency within a range for which the apparatus is adapted to be used. Also, as a result, over-excursion of the pen or marking element is prevented.

As shown in Fig. 2, each channel has its individual gain control means, which includes the conjointly variable resistances 76 and 77, so that the gain is set individually for each channel. The sensitivity controls for channels A, B and C are indicated in Fig. 1 at 78, 79, and 80, respectively, and said sensitivity control 78 is also shown in Fig. 2. It will be noted that the sensitivity control for each channel is connected in the input circuit of an amplifier stage. For example, as illustrated in Fig. 2, control 78 has one portion thereof connected to the input of amplifier stage T5 and another portion connected to the input of amplifier stage T6. Also it will be noted that the individual controls 76 and 77 are connected in shunt with said portions of control 78. It will be understood that sensitivity controls 79 and 80 for channels B and C are the same as control 78 of channel A and are connected in their respective amplifier circuits in the same way as control 78.

In accordance with the present invention, the sensitivity control for each channel includes a set of resistors with taps, as shown, terminating in stationary switch-contacts which are selectively engageable by the movable switch-contact members 81—82 for channel A, 83—84 for channel B, and 85—86 for channel C. As indicated in Figs. 1 and 2, the movable switch-contact members are all connected or ganged for movement in unison by a uni-control device indicated by the dot-and-dash lines designated 87, 88, 89 and 90. Thus, by merely operating the switch actuating member 90 all of the sensitivity controls 78, 79 and 80 are simultaneously adjusted. In Fig. 1 and also in Fig. 2, the movable contact members 81—82 of the sensitivity control 78 (channel A) are in the position, in engagement with the contacts *a*—*a1* respectively, for the sensitivity required for the inter-extremity (standard) potentials, and as shown in Fig. 1, the movable contact members 83—84 and 85—86 of sensitivity controls 79 and 80 are in corresponding positions. When the movable contact members are moved to stationary contacts *b*—*b1*, the sensitivity is one half of the *a*—*a1* sensitivity; when said movable contacts are at stationary contacts *c*—*c1*, the sensitivity is 1½ as great as the *a*—*a1* sensitivity; and when said movable contacts are at contacts *d*—*d1*, the sensitivity is twice as great as the *a*—*a1* sensitivity. Thus, it will be understood that once the gain of the amplifiers in channels A, B and C is adjusted by variable resistances 76, 77 in each channel and so that the desired gain for each channel is equal to the gain of the other channels, the sensitivity of all of the channels can be simultaneously and instantaneously adjusted to the desired value by operating member 90 of the uni-control device, and said sensitivity can be altered to a selected predetermined multiple of said sensitivity within a group of predetermined sensitivities, in accordance with the primary object of this invention.

It will be noted that when the movable contact members are at stationary contacts *e*—*e1* of controls 78, 79, and 80, the inputs to tubes T5 and T6 are grounded or short-circuited and hence the gain of the amplifier in each channel is reduced to zero, thus preventing the transmission of signals to the power tubes. In the use of the cardiograph, this condition is desirable, as stated above, when the leads are removed from the patient. As soon as the leads are again connected to the patient, the gain set by the previously adjusted resistances 76 and 77 and the desired sensitivity can be restored immediately by operating the uni-control member 90 to move the movable contact members 81—82, 83—84 and 85—86 to the appropriate sensitivity position.

As shown in Fig. 1, the time delay switch 46 comprises a bimetallic strip 46A which is heated by the heater 46B when switches 49, 50 are closed and when the movable contact 54 of switch 10 is connected to any one of the stationary contacts 55, 56, 57, 58 or 59 of switch 10, power supply switch S being closed. When said thermostatic strip 46A is heated sufficiently it closes the circuit through winding 42 at contact 47, whereupon armature 43 is attracted and opens the heater circuit at contact 43 and closes the circuit, at contact 43*b*, through winding 42, simultaneously short-circuiting the heater 46b. The switch operating rod 44 is connected to armature 43 so that when the latter is attracted, switches 42A, 42B and 42C are closed and remain closed until the winding 42 is de-energized by the opening of the switches 49 or 50 or by movement of contact member 54 of the selector switch to an off position.

The standardization voltage circuit 30 (Fig. 1) is connected as shown in Fig. 2 through the reversing switch 92 to the leads 93 and 94 of the cathodes of tubes T1 and T2 of the voltage amplifier. The pulse wheel 40 of said circuit may be omitted and switch 38 may be closed manually for any desired period of time.

The recorder illustrated schematically in Fig. 1 is shown and described in my above-mentioned application and as it is not per se part of the present invention it need not be described herein. This application is a continuation-in-part of my said prior application, Serial No. 762,633, now Patent No. 2,627,267.

It will be understood that the invention may be embodied otherwise than as hereinbefore described and that various changes may be made without departing from the underlying idea or principles of the invention within the scope of the appended claims.

Having thus described my invention, what I claim and desire to secure by Letters Patent, is:

1. In an electro-cardiograph, a plurality of channels for amplifying body potentials transmitted thereto, respectively, means in circuit with the respective channel inputs for connecting simultaneously a plurality of pairs of leads for potentials across different pairs, respectively, of different parts of the subject's body to said channels, respectively, for concomitant transmission of the potentials at the different parts, respectively, a deflectable marking element for each channel, means at the output of each channel for energizing its associated marking element in accordance with the potential transmitted thereto, and a manual step-variable sensitivity control device in each channel, said devices being ganged for conjoint manual operation, whereby the sensitivity of all of said channels can be simultaneously and instantaneously adjusted to a desired value for similarly and concomitantly adjusting the deflection ratios of all the marking elements.

2. In an electro-cardiograph, a plurality of channels for amplifying body potentials transmitted thereto, respectively, means in circuit with the respective channel inputs for connecting simultaneously a plurality of pairs of leads for potentials across differents pairs, respectively, of different parts of the subject's body to said channels, respectively, for concomitant transmission of the potentials at the different parts, respectively, a deflectable marking element for each channnel, means at the output of each channel for energizing its associated marking element in accordance with the potential transmitted thereto, and a manual step-variable sensitivity control device in each channel, said devices being ganged for conjoint manual operation, whereby the sensitivity of all of said channels can be simultaneously and instantaneously adjusted to a desired value for similarly and concomitantly adjusting the deflection ratios of all the marking elements, each of said channels being provided with an additional manual sensitivity control means, said latter means being separately adjustable to individually set the deflection ratio of the associated marking element.

3. In an electro-cardiograph, a plurality of channels for amplifying body potentials transmitted thereto, respectively, means in circuit with the respective channel inputs for connecting simultaneously a plurality of pairs of leads for potentials across different pairs, respectively, of different parts of the subject's body to said channels, respectively, for concomitant transmission of the potentials at the different parts, respectively, a deflectable marking element for each channel, means at the output of each channel for energizing its associated marking element in accordance with the potential transmitted thereto, and a manual step-variable sensitivity control device in each channel, said devices being ganged for conjoint manual operation, whereby the sensitivity of all of said channels can be simultaneously and instantaneously adjusted to a desired value for similarly and concomitantly adjusting the deflection ratios of all the marking elements, each of said channels being provided with an additional manual sensitivity control means, said latter means being separately adjustable to individually set the deflection ratio of the associated marking element, said additional sensitivity-control means in each channel being in shunt with the step-variable control device thereof.

4. In a multi-channel recording apparatus provided with a plurality of independently operable and deflectable marking elements, a plurality of amplifying channels, one for each marking element, means at the output of each channel for energizing its associated marking element, and a manual step-variable sensitivity control device for each channel, said devices being ganged for conjoint manual operation, whereby the sensitivity of all of said channels can be simultaneously and instantaneously adjusted to a desired value for similarly and simultaneously adjusting the deflection ratios of all the marking elements.

5. In a multi-channel recording apparatus provided with a plurality of independently operable and deflectable marking elements, a plurality of amplifying channels, one for each marking element, means at the output of each channel for energizing its associated marking element, and a manual step-variable sensitivity control device for each channel, said devices being ganged for conjoint manual operation, whereby the sensitivity of all of said channels can be simultaneously and instantaneously adjusted to a desired value for similarly and simultaneously adjusting the deflection ratios of all the marking elements, each of said channels being provided with an additional manual sensitivity-control means, said latter means being separately adjustable to individually set the deflection ratio of the associated marking element.

6. In a multi-channel recording apparatus provided with a plurality of independently operable and deflectable marking elements, a plurality of amplifying channels, one for each marking element, means at the output of each channel for energizing its associated marking element, and a manual step-variable sensitivity control device for each channel, said devices being ganged for conjoint manual operation, whereby the sensitivity of all of said channels can be simultaneously and instantaneously adjusted to a desired value for similarly and simultaneously adjusting the deflection ratios of all the marking elements, each of said channels being provided with an additional manual sensitivity-control means, said latter means being separately adjustable to individually set the deflection ratio of the associated marking element, said additional sensitivity-control means in each channel being in shunt with the step-variable control device thereof.

7. In an electro-cardiograph, a plurality of channels for amplifying body potentials transmitted thereto, respectively, means in circuit with the respective channel inputs for connecting simultaneously a plurality of pairs of leads for potentials across different pairs, respectively, of different parts of the subject's body to said channels, respectively, for concomitant transmission of the potentials at the different parts, respectively, a deflectable marking element for each channel, means at the output of each channel for energizing its associated marking element in accordance with the potential transmitted thereto, and a manual step-variable sensitivity control device in each channel, said devices being ganged for conjoint manual operation, whereby the sensitivity of all of said channels can be simultaneously and instantaneously adjusted to a desired value for similarly and concomitantly adjusting the deflection ratios of all the marking elements, each of said channels being provided with an additional manual sensitivity control means, said latter means being separately adjustable to individually set the deflection ratio of the associated marking element, each control device having a step for preventing transmission to its associated output means, whereby to prevent deflection of the associated marking element.

8. In a multi-channel recording apparatus provided with a plurality of independently operable and deflectable marking elements, a plurality of amplifying channels, one for each marking element, means at the output of each channel for energizing its associated marking element, and a manual step-variable sensitivity control device for each channel, said devices being ganged for conjoint manual operation, whereby the sensitivity of all of said channels can be simultaneously and instantaneously adjusted to a desired value for similarly and simultaneously adjusting the deflection ratios of all the marking elements, each of said channels being provided with an additional manual sensitivity-control means, said latter means being separately adjustable to individually set the deflection ratio of the associated marking element, each control device having a step for preventing transmission to its associated output means, whereby to prevent deflection of the associated marking element.

References Cited in the file of this patent

UNITED STATES PATENTS

| Number | Name | Date |
|---|---|---|
| 1,715,415 | Hanson et al. | June 4, 1929 |
| 1,822,922 | Culver | Sept. 15, 1931 |
| 1,824,801 | Bouton | Sept. 29, 1931 |
| 1,973,453 | Whiting | Sept. 11, 1934 |
| 2,000,433 | Borden | May 7, 1935 |
| 2,178,225 | Diehl et al. | Oct. 31, 1939 |
| 2,184,565 | Pesce | Dec. 26, 1939 |
| 2,225,196 | Miessner | Dec. 17, 1940 |
| 2,265,637 | Ferris | Dec. 9, 1941 |
| 2,339,976 | Brown | Jan. 25, 1944 |
| 2,343,471 | Nixon | Mar. 7, 1944 |
| 2,364,755 | Ritzmann | Dec. 12, 1944 |
| 2,374,204 | Hoover, Jr. | Apr. 24, 1945 |
| 2,430,246 | Piety | Nov. 4, 1947 |
| 2,430,983 | Hoover, Jr. | Nov. 18, 1947 |
| 2,431,651 | Spencer | Nov. 25, 1947 |
| 2,466,691 | Daniels | Apr. 12, 1949 |
| 2,530,101 | Van Loon et al. | Nov. 14, 1950 |
| 2,541,326 | Bielek | Feb. 13, 1951 |

FOREIGN PATENTS

| Number | Country | Date |
|---|---|---|
| 109,261 | Great Britain | Nov. 30, 1939 |
| 822,382 | France | Sept. 20, 1937 |